United States Patent
Foxlin

(10) Patent No.: US 11,747,475 B1
(45) Date of Patent: Sep. 5, 2023

(54) SYSTEM TO DETECT AND MAP REFLECTIVE SURFACES BY AUTONOMOUS MOBILE DEVICE

(71) Applicant: AMAZON TECHNOLOGIES, INC., Seattle, WA (US)

(72) Inventor: Eric Foxlin, Saratoga, CA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 795 days.

(21) Appl. No.: 16/815,538

(22) Filed: Mar. 11, 2020

(51) Int. Cl.
| | |
|---|---|
| G01S 17/86 | (2020.01) |
| G01S 17/42 | (2006.01) |
| G01S 17/04 | (2020.01) |
| G01S 17/931 | (2020.01) |
| G01S 17/89 | (2020.01) |
| G06V 20/20 | (2022.01) |
| G06V 20/58 | (2022.01) |
| G01S 17/02 | (2020.01) |
| G06T 7/70 | (2017.01) |
| G06V 10/60 | (2022.01) |

(52) U.S. Cl.
CPC ............. *G01S 17/86* (2020.01); *G01S 17/02* (2013.01); *G01S 17/04* (2020.01); *G01S 17/42* (2013.01); *G01S 17/89* (2013.01); *G01S 17/931* (2020.01); *G06T 7/70* (2017.01); *G06V 20/20* (2022.01); *G06V 20/58* (2022.01); *G06V 10/60* (2022.01)

(58) Field of Classification Search
CPC .................................. G01S 17/86; G06T 7/70
USPC ............................................................ 356/5
See application file for complete search history.

(56) References Cited

U.S. PATENT DOCUMENTS

| | | | |
|---|---|---|---|
| 2011/0199335 A1* | 8/2011 | Li | G06F 3/0428 345/175 |
| 2020/0401827 A1* | 12/2020 | Storm | G06V 40/167 |

OTHER PUBLICATIONS

Stoytchev, Alexander, "Self-detection in robots: a method based on detecting temporal contingencies", Developmental Robotics Laboratory, Department of Electrical and Computer Engineering, Iowa State University. Robotica (2011) vol. 29, pp. 1-21. Retrieved from the Internet: URL: https://www.ece.iastate.edu/~alexs/papers/Robotica_2011/Self-Detection_In_Robots.pdf.

* cited by examiner

*Primary Examiner* — Amir Shahnami
(74) *Attorney, Agent, or Firm* — Lindauer Law, PLLC

(57) ABSTRACT

An autonomous mobile device (AMD) in a physical space uses its own reflection to detect and map reflective surfaces. A first image is acquired by a camera of the AMD at a first time while a light on the AMD is turned on. The first image is processed to find a candidate reflection, characterized by a bright spot in the image. A second image is acquired at a second time while the light is off. The reflection is confirmed by absence of the candidate reflection in the second image. A display on the AMD presents a displayed image at a third time. A third image acquired during the third time is processed to find the features of the displayed image. Once found, a location and orientation in physical space of a plane of the surface causing the reflection is calculated. An occupancy map is updated to include this information.

20 Claims, 9 Drawing Sheets

SYSTEM TO DETECT AND MAP REFLECTIVE SURFACES BY AUTONOMOUS MOBILE DEVICE

BACKGROUND

An autonomous mobile device (AMD) moves throughout a physical space. To facilitate this movement, the AMD uses information about where it is in the physical space, and location of obstacles. These obstacles may include optically transparent or reflective surfaces.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
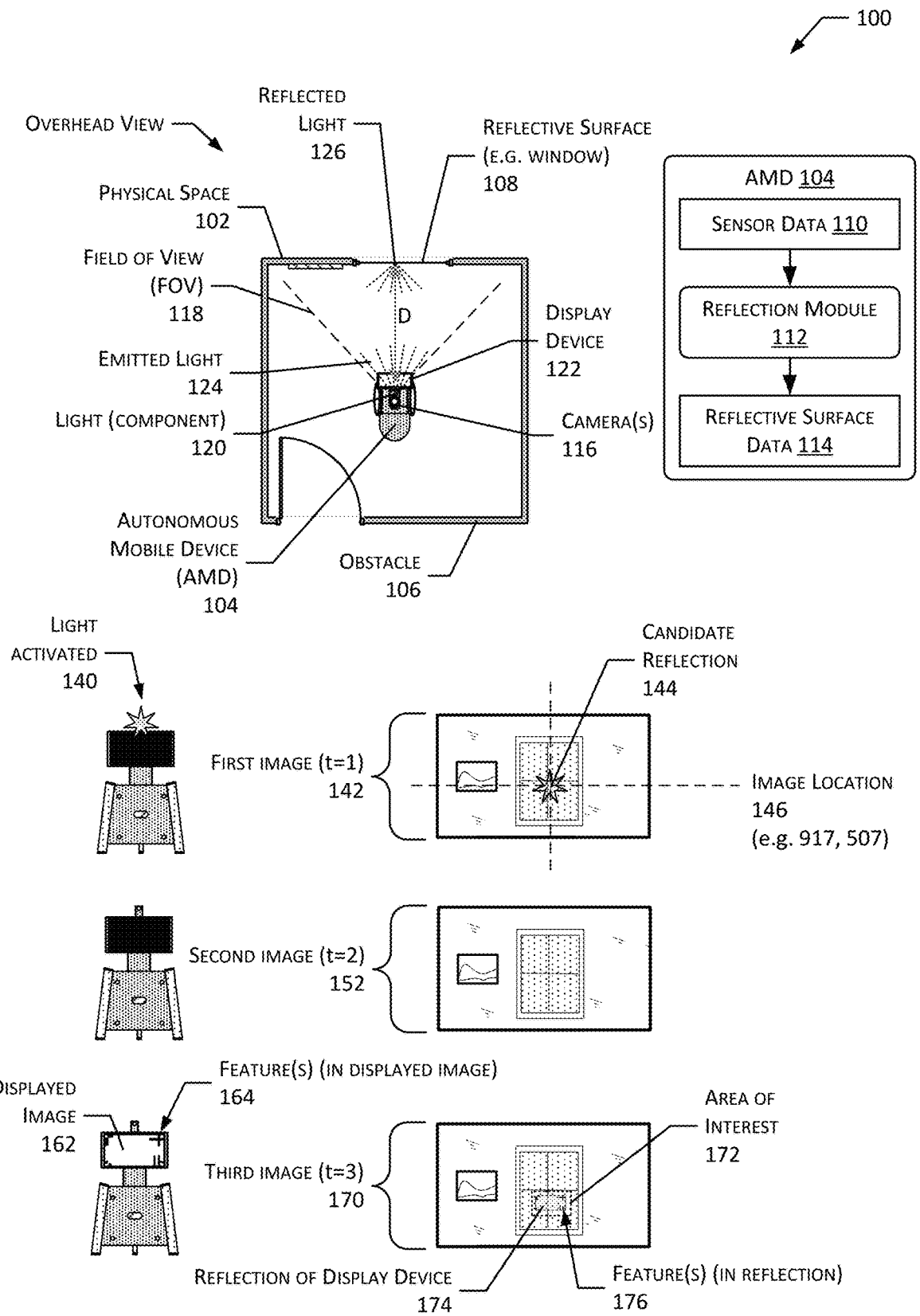
FIG. 1 illustrates a system for determining reflective surfaces in a physical space with an autonomous mobile device (AMD), according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) such as a robot is capable of autonomous movement, allowing it to move from one location in the physical space to another without being "driven" or remotely controlled by a user. The AMD may perform tasks that involve moving within the physical space. These tasks may also include patrolling the physical space, interacting with users, and so forth. For example, the AMD may perform sentry tasks involving moving through rooms in the physical space.

During autonomous movement, the AMD may perform a mapping process that determines where obstacles are in the physical space. Various sensors may be used to acquire data about the physical space. For example, images acquired by one or more cameras may be processed to detect obstacles and determine where those obstacles are in the physical space. However, systems to map the physical space using optical techniques such as cameras, structured light, lidar, and so forth, may be hampered by reflective surfaces. Reflective surfaces such as glass, polished glass or stone, mirrors, and so forth may reflect images of another portion of the physical space, may reflect emitted light such as a laser pulse from a lidar, and so forth. As a result, mapping data may be incorrect. For example, data from a camera that acquires an image of a mirror may incorrectly result in a map of a room that doesn't actually exist except as a reflection.

Incomplete or inadequate detection of transparent surfaces may also impair operation of the AMD. For example, the AMD should detect the presence of a glass door to avoid collision with that glass door. In another example, the AMD should detect the presence of a mirror to avoid trying to travel through the mirror.

Described in this disclosure are techniques and systems to determine the presence of reflective surfaces that exhibit specular reflection. The AMD includes one or more components to produce light, such as light emitting diodes (LEDs). The AMD also includes one or more cameras to acquire images of the physical space. A first image is acquired by a camera of the AMD at a first time while a light on the AMD is turned on. For example, the light may comprise an infrared or visible light LED that provides a flash of emitted light. The first image is processed to find a candidate reflection, characterized by a bright spot in the first image. For example, a blob detection algorithm may be used to identify a region in the first image that exhibits a brightness value greater than a threshold value, with a minimum and maximum area, and having an approximately circular shape. In some implementations the threshold value may be specified with respect to the brightness of adjacent pixels.

A second image is acquired at a second time while the light is off. The presence of an actual reflection is confirmed by the absence of the candidate reflection in the second image. For example, if the candidate reflection was something else, such as a light source in the physical space, the candidate reflection would still be observed if the light is off.

A distance to the surface that produced the candidate reflection may be determined. For example, if the AMD uses stereovision, a disparity in the apparent position of the candidate reflection in a first pair of stereoimages may be used to determine a distance to the reflection of the light by the reflective surface. In another example, an ultrasound sensor may provide a distance to the surface. In yet another example, the distance may be approximated based on an apparent size of the reflected light in the first image.

An area of interest within images acquired by the camera may be determined based on the candidate reflection and the distance. For example, an image location (location) indicative of the coordinates with respect to the plane of the images acquired by the camera may be determined for the candidate reflection in the first image. Continuing the example, the image location may comprise coordinates indicative of row and column of a center of the candidate reflection.

The area of interest may be centered on the image location of the candidate reflection and the size of the area may be based on the distance. For example, as the distance increases the size of the area of interest decreases.

At a third time, a plurality of lighting components are activated to emit light. For example, a display device may be activated to present a displayed image comprising a white rectangle. In another example, three or more lights on the AMD may be activated.

A third image acquired by the camera during the third time is processed to find the features of the displayed image. For example, the features may comprise corners of the white rectangle, the lights in the image, and so forth. Once the image locations for these features are determined in the third image, a location and orientation in physical space of a plane of the surface causing the reflection is calculated. For example, a perspective-n-point algorithm may be used. Continuing the example, given the known arrangement and geometry of the display device and the displayed image, and given the presence of three or more features in the acquired third image, the orientation and geometry in the physical space of the reflective surface may be calculated and stored as reflective surface data.

The AMD may determine reflective surfaces while stationary or while moving through the physical space. For example, while moving the AMD may perform the process described herein.

The type of reflective surface may be characterized in some implementations. For example, the intensity of the light used to generate reflections may be varied. By assessing the intensity of reflected light received by the camera the reflective surface may be characterized. Continuing the example, transparent glass may provide a reflection only when illuminated at high intensity, while a mirror may provide a reflection when illuminated at low intensity.

In some implementations the reflective surface data may be stored as a layer of information with regard to an occupancy map that provides other information about obstacles in the physical space. The occupancy map may then be used to facilitate autonomous navigation of the AMD. By determining the locations of reflective surfaces, the AMD is also able to selectively disregard or utilize sensor data obtained from those reflective surfaces. For example, the AMD may disregard lidar data obtained while the lidar is pointed at a mirror. In another example, the AMD may disregard portions of images associated with reflective surface during simultaneous localization and mapping (SLAM) operations.

By determining the presence of the reflective surface, operation of the AMD is significantly improved. The resulting occupancy maps are more accurate, and the AMD is better able to avoid collisions with reflective objects.

Illustrative System

FIG. 1 illustrates a system 100 for determining reflective surfaces in a physical space 102 with an autonomous mobile device (AMD) 104, according to some implementations. In this illustration an overhead view of the physical space 102 is shown. One or more obstacles 106 may be present within the physical space 102. For example, obstacles 106 may comprise walls, furnishings, stairwells, people, and so forth. Some of these obstacles 106 may have one or more reflective surfaces 108. These reflective surfaces 108 may produce specular reflection of incident light. For example, the reflective surfaces 108 may include, but are not limited to, window glass, glass doors, mirrors, polished metal, polished stone, and so forth.

While moving from one location to another, the AMD 104 needs to determine where it is at a given time, determine the location of obstacles 106, and move while avoiding collisions with any of these obstacles 106. A command to move may be the result of an input from the user, a previously scheduled task, responsive to input from one or more sensors, a command from an external computing device, or another source.

The AMD 104 may use one or more sensors to acquire sensor data 110 that is provided to a reflection module 112. The reflection module 112 processes the sensor data 110 to determine reflective surface data 114. The sensor data 110 may comprise images acquired by one or more cameras 116. Each camera 116 has a field of view (FOV) 118 that encompasses at least a portion of the physical space 102. The AMD 104 may also include output devices such as one or more lighting components (lights) 120. These lights 120 may include running lights, lights to provide illumination for operation of the camera 116, and so forth. The AMD 104 may also include a display device 122. The light 120 may generate visible light, infrared light, ultraviolet light, and so forth. For example, the light 120 may comprise an LED that generates infrared light that is not visible to a human user.

When activated, emitted light 124 from one or more of the light 120 or the display device 122 may interact with the reflective surface 108. Resulting reflected light 126 may be directed back towards the camera 116. The AMD 104 is a distance "D" from the reflective surface 108. As described below, by controlling the emitted light 124, and looking for the reflected light 126, the reflection module 112 is able to determine the presence and position of a reflective surface 108 and generate reflective surface data 114.

At a first time, t=1, a light 120 on the AMD 104 is activated 140. During the first time, a first image 142 is acquired using the camera 116. An example of the first image 142 is shown with a candidate reflection 144. The candidate reflection 144 may be determined as a localized maxima of pixel intensity of a minimum size and predetermined shape. For example, a blob detection algorithm may be used, such as the SimpleBlobDetector function of the OpenCV library as developed by Intel Corporation of Santa Clara, California, USA; Willow Garage of Menlo Park, California, USA; and Itseez of Nizhny Novgorod, Russia, with information available at www.opencv.org.

The images produced by the camera 116 may comprise an array arranged in rows and columns. Each element in the array may have associated data, such as color, brightness, and so forth. An image location 146 comprises a set of coordinates of the element within the array of the image. For example, the image location 146 may indicate the row and column of a particular pixel in the image. In this illustration, the candidate reflection 144 is centered at an image location 146 along a horizontal axis of the image (column) of 917 and a vertical axis of the image (row) of 507. In other implementations, the image location 146 may be expressed using other techniques, such as vector value.

To determine whether the candidate reflection 144 is indeed a reflection of the activated 140 light 120, at a second time t=2 the light 120 is deactivated. A second image 152 is acquired during the second time. In this illustration, no candidate reflection 144 is shown. The absence of the candidate reflection 144 may be considered indicative of the candidate reflection 144 being an actual reflection of the activated 140 light 120.

The single candidate reflection 144 is indicative of a reflective surface 108 being present, but the orientation of that reflective surface 108 may be determined by observing more than one reflection of emitted light 124 from the AMD 104. At a third time t=3, the display device 122 presents a displayed image 162. The displayed image 162 includes several features 164. For example, the displayed image 162 may comprise a white rectangle on a black background. The features 164 may comprise the corners of the white rectangle. In another example, the features 164 may comprise fiducials. The fiducials may be configured to provide unique indicia of particular locations within the displayed image 162, orientation of the displayed image 162, and so forth. For example, the fiducials may comprise particular patterns of light and dark squares that encode information about the presence of a particular corner of a rectangular pattern and indicate a specific corner in the rectangular pattern.

The emitted light 124 from the display device 122 is reflected by the reflective surface 108, and a third image 170 is acquired by the camera 116. The third image 170 is processed to determine if a reflection of the display device 174 is present.

In one implementation an area of interest 172 in an image may be determined. For example, the area of interest 172 may be centered on the image location 146 of the candidate reflection 144. The size of the area of interest 172 may be determined. The size of the area of interest 172 may be calculated using the distance "D". For example, as the distance "D" decreases, the apparent size of the area of interest 172 will increase. Continuing the example, as the distance "D" increases, the apparent size of the area of interest would decrease.

In one implementation, the AMD 104 includes a pair of cameras 116 operating as a stereo camera with stereovision, the disparity in a left image location 146 between the candidate reflection 144 as it appears in a left image as compared to a right image location 146 may be used to determine the distance. Because of the reflection produced by the reflective surface 108, an initial distance may be divided by two to produce the distance "D".

In other implementations, the distance "D" may be determined using a time of flight (TOF) sensor. For example, an ultrasonic sensor, radar, time-of-flight camera, or lidar may emit a signal and detect the reflection of that signal. The signal may be electromagnetic, acoustic, and so forth. Based on the time between emission and detection, the distance "D" may be calculated.

The portion of the third image 170 designated by the area of interest 172 may be processed to determine the presence of one or more features 176 as reflected by the reflective surface 108. By using the area of interest 172 to limit the processing to a portion of the third image 170, computational requirements are reduced and latency is reduced. In other implementations the determination and use of the area of interest 172 may be omitted. For example, the entire third image 170 may be processed to determine the presence of the features 176.

In another implementation, a single image maybe be processed to determine the presence of one or more candidate reflections 144. For example, a plurality of lights 120 may be activated, and a fourth image acquired while those lights 120 are active. The fourth image may be processed to determine a plurality of image locations 146 of candidate reflections 144 that may correspond to the plurality of lights. The plurality of image locations 146 may be compared to one or more hypotheses. Each hypothesis may correspond to a particular relative arrangement of the AMD 104 and a hypothetical reflective surface 108. In other implementations, a trained neural network may be used to accept as input the plurality of image locations 146 and generate as output at least a portion of the reflective surface data 114.

A set of image locations 146 associated with the features 176 in the reflection may be determined. For example, the fiducials presented in the displayed image 162 may be recognized in the third image 170 and associated with particular corners of the displayed image 162, such as "corner1, corner2, corner3, and corner4" of the displayed image 162.

The geometry of the sources of the emitted light 124 is known. In one implementation, the display device 122 may be used to emit the light 124. The size and shape of the display device 122 is known in advance. Also known are the relative geometry of the camera(s) 116 with respect to the display device 122. For example, the center of the display device 122 to the center of the image sensor of the camera 116 may be known. Unknown is the relative orientation of the reflective surface 108 with respect to the AMD 104. However, this can be reconstructed based on the information available. For example, a perspective 4-point (P4P) pose recovery may be performed. Using the P4P pose recovery, the apparent pose of the reflection of the display device 174 may be calculated. This provides information such as the distance from each corner of the display device 122 to a corresponding corner of the reflection of the display device 174. Because the reflection doubles the distance, the actual location of the reflective surface 108 is at a midpoint between each actual corner of the display device 122 and the reflected corner in the reflection of the display device 174. Given the four midpoints, one for each corner of the display device 122, and assuming a planar reflective surface 108, the plane of the reflective surface 108 may be determined.

In another implementation, one or more of the light 120 components on the AMD 104 may be activated to provide the emitted light 124. These lights 120 may be activated simultaneously, or sequentially. Given their known placement with respect to the body of the AMD 104, the reflected image of those activated lights 140 in the third image 170 may be used to determine the orientation of the reflective surface 108 with respect to the AMD 104.

The position and orientation of the reflective surface 108 with respect to the AMD 104 may be converted into other coordinate systems or reference frames as needed. For example, the AMD 104 may have determined its position and orientation with respect to the physical space 102 using techniques such as SLAM. Given the position and orientation (or pose) of the AMD 104 during the first time and the second time, the position and placement of the reflective surface 108 may be expressed with respect to other features in the physical space 102 as determined by SLAM. The reflective surface data 114 may thus indicate the position and orientation of the reflective surface 108 with respect to the physical space 102. In some implementations, the reflective surface data 114 may comprise a layer of an occupancy map, as described with regard to FIG. 2.

The reflective surface data 114 may comprise information that characterizes the reflective surface 108. For example, a mirror may be very reflective, while a window may be somewhat reflective. In one implementation, the intensity of the emitted light 124 may be changed and images may be acquired with the different intensities in use. For example, at a fourth time t=4 (not shown) the intensity of the light 120 may be reduced and a fourth image acquired using the camera 116. The candidate reflection 144 in the fourth image may be determined. If the intensity or brightness of the candidate reflection 144 in the fourth image is greater than a threshold value, the reflective surface 108 may be designated as a mirror. However, if the brightness is less than the threshold value, the reflective surface 108 may be designated as transparent glass.

In another implementation, the reflective surface 108 may be characterized by determining a reflection coefficient. For example, given a known light output of the light(s) 120 operating at a particular time and known exposure settings of the camera 116 at that time, the reflection coefficient or reflectance of the reflective surface 108 may be determined.

By determining and using the reflective surface data 114, operation of the AMD 104 is improved. For example, sensor data 110 obtained from cameras 116, lidar, or other optical methods that is associated with a reflective surface 108 may be compensated for or disregarded. In another example, the reflective surface data 114 significantly reduces the likelihood that the AMD 104 would inadvertently collide with a reflective surface 108.

Figure 2:
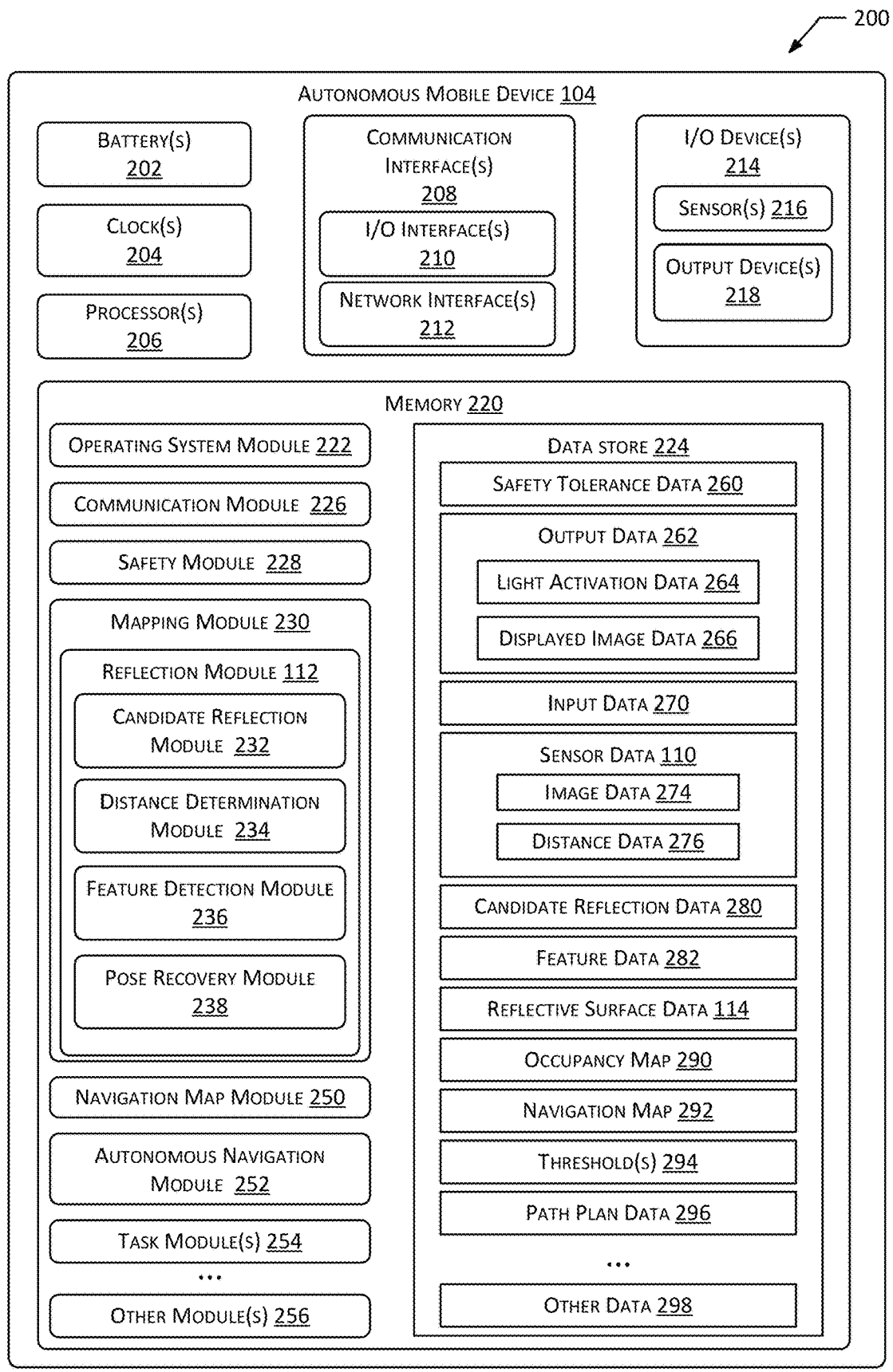
FIG. 2 is a block diagram of the components of the AMD, according to some implementations.

FIG. 2 is a block diagram 200 of the AMD 104, according to some implementations. The AMD 104 may include one or more batteries 202 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

One or more clocks 204 may provide information indicative of date, time, ticks, and so forth. For example, a processor 206 may use data from the clock 204 to associate a particular time with an action, control operation of the lights 120, display device 122, the sensor data 110, and so forth.

The AMD 104 may include one or more hardware processors 206 (processors) configured to execute one or more stored instructions. The processors 206 may comprise one or more cores. The processors 206 may include microcontrollers, systems on a chip, field programmable gate arrays, digital signal processors, graphic processing units, general processing units, and so forth.

The AMD 104 may include one or more communication interfaces 208 such as input/output (I/O) interfaces 210, network interfaces 212, and so forth. The communication interfaces 208 enable the AMD 104, or components thereof, to communicate with other devices or components. The communication interfaces 208 may include one or more I/O interfaces 210. The I/O interfaces 210 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 210 may couple to one or more I/O devices 214. The I/O devices 214 may include input devices such as one or more of a sensor 216, keyboard, mouse, scanner, and so forth. The I/O devices 214 may also include output devices 218 such as one or more of a motor, light 120, speaker, display device 122, projector, printer, and so forth. In some embodiments, the I/O devices 214 may be physically incorporated with the AMD 104 or may be externally placed.

The network interfaces 212 may be configured to provide communications between the AMD 104 and other devices such as other AMDs 104, docking stations, routers, access points, and so forth. The network interfaces 212 may include devices configured to couple to personal area networks (PANs), local area networks (LANs), wireless local area networks (WLANS), wide area networks (WANs), and so forth. For example, the network interfaces 212 may include devices compatible with Ethernet, Wi-Fi, Bluetooth, Bluetooth Low Energy, ZigBee, and so forth. The AMD 104 may also include one or more busses or other internal communications hardware or software that allow for the transfer of data between the various modules and components of the AMD 104.

As shown in FIG. 2, the AMD 104 includes one or more memories 220. The memory 220 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 220 provides storage of computer-readable instructions, data structures, program modules, and other data for the operation of the AMD 104. A few example functional modules are shown stored in the memory 220, although the same functionality may alternatively be implemented in hardware, firmware, or as a system on a chip (SoC).

The memory 220 may include at least one operating system (OS) module 222. The OS module 222 is configured to manage hardware resource devices such as the I/O interfaces 210, the I/O devices 214, the communication interfaces 208, and provide various services to applications or modules executing on the processors 206. The OS module 222 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; the AMD Operating System (ROS) as promulgated at www.ros.org, and so forth.

Also stored in the memory 220 may be a data store 224 and one or more of the following modules. These modules may be executed as foreground applications, background tasks, daemons, and so forth. The data store 224 may use a flat file, database, linked list, tree, executable code, script, or other data structure to store information. In some implementations, the data store 224 or a portion of the data store 224 may be distributed across one or more other devices including other AMDs 104, servers, network attached storage devices, and so forth.

A communication module 226 may be configured to establish communication with other devices, such as other AMDs 104, an external server, a docking station, and so forth. The communications may be authenticated, encrypted, and so forth.

Other modules within the memory 220 may include a safety module 228, a mapping module 230, a navigation map module 250, an autonomous navigation module 252, one or more task modules 254, or other modules 256. The mapping module 230 may include the reflection module 112. The reflection module 112 may include a candidate reflection module 232, a distance determination module 234, a feature detection module 236, a pose recovery module 238, or other modules. The modules may use data stored within the data store 224, including safety tolerance data 260, output data 262, input data 270, sensor data 110 including image data 274 and distance data 276, candidate reflection data 280, feature data 282, reflective surface data 114, an occupancy map 290, a navigation map 292, thresholds 294, path plan data 296, other data 298, and so forth.

The mapping module 230 is used to determine information about presence and placement of obstacles 106 in the physical space 102. This information may be stored as the occupancy map 290. The mapping module 230 may use sensor data 110 such as images stored as image data 274 acquired from one or more cameras 116 to generate the occupancy map 290. The occupancy map 290 may include different sets of data, or layers. For example, a first layer may indicate the location of fixed obstacles such as walls, a second layer may indicate the locations of reflective surfaces 108, and so forth.

The mapping module 230 may utilize the reflection module 112 to generate reflective surface data 114 about the reflective surfaces 108 in the physical space 102. The reflection module 112 may include a candidate reflection module 232. The candidate reflection module 232 processes images, such as a first image 142, to determine candidate reflection data 280 indicative of the presence of a candidate reflection 144. For example, the candidate reflection module 232 may use a blob detection algorithm, such as the SimpleBlobDetector function of the OpenCV library with information available at www.opencv.org.

The candidate reflection module 232 may process the first image 142 to determine a region in the image, or "blob" having particular characteristics. These characteristics may include, but are not limited to, an area that is greater than a first threshold value and less than a second threshold value, a circularity value that is greater than a third threshold value, a color value that is greater than a fourth threshold value, and so forth. For example, the area of the region may need to be greater than 10 pixels and fewer than 1000 pixels. The circularity value is indicative of how close the region is to being circular. For example, a circle would have a circularity value of 1. Circularity may be defined as: (4*pi*area of the region)/((perimeter)*(perimeter)). The color value may indicate a particular color or, in the case of grayscale images, an intensity or brightness. In some implementations the candidate reflection module 112 may use other characteristics including but not limited to convexity, inertia ratio, and so forth. The candidate reflection module 232 may provide as output information such as an image location 146 of a center of the candidate reflection 144, a radius or area of the candidate reflection 144, an average brightness of the region, and so forth.

The candidate reflection data 280 produced by the candidate reflection module 232 may be indicative of the image location 146 and the characteristics of the region associated with the candidate reflection 144. For example, the candidate reflection data 280 may include one or more of the image location 146, area, radius, diameter, circularity, color, intensity, and so forth.

The candidate reflection module 280 may be configured to coordinate operation of the camera 116 and the lights 120. For example, the candidate reflection module 280 may operate the light 120 to be activated 140 during acquisition of the first image 142. In other implementations the candidate reflection module 232 may use existing image data 274 and light activation data 264 to determine when a particular light 120 was activated 140, duration of the activation, whether the activation of the light 120 corresponds in time with the acquired image data 274, and so forth. The light activation data 264 may comprise information that indicates when a particular light 120 was activated, characteristics of that activation such as intensity, duration, color, and so forth. Lights 120 may be activated by other processes on the AMD 104, responsive to user commands, responsive to commands from the reflection module 112, and so forth.

A distance determination module 234 may be used to determine the distance "D" between a portion of the AMD 104 and an obstacle 106 such as the reflective surface 108. In one implementation the distance determination module 234 may use the distance data 276 generated by one or more sensors 216. For example, a time of flight (TOF) sensor such as an ultrasonic sensor, lidar, radar, and so forth may provide as output distance data 276 that may be used as the distance "D". These sensors 216 are described in more detail with regard to FIG. 3.

In another implementation, if the cameras 116 include a pair of cameras, stereovision techniques may be used to determine the distance "D". For example, a first stereopair of images may be acquired at the first time, with one image acquired by a left camera 116 and another image acquired by a right camera 116. The image location 146 of the candidate reflection 144 as it appears in each of the images in the stereopair may be determined by the candidate reflection module 232 as described above. The distance determination module 234 may use the disparity, or apparent difference in position of the image location 146 in the candidate reflection 144 between the first stereopair of images to determine the distance.

In yet another implementation, the distance may be inferred based on a monocular image from a single camera 116 based on the characteristics of the candidate reflection 144. For example, the apparent diameter of the candidate reflection 144 in the first image 142 may be used to approximate the distance "D". Continuing the example, an apparent diameter of the candidate reflection 144 of 50 pixels may be deemed indicative of a distance of approximately 2 meters while an apparent diameter of 300 pixels may be deemed indicative of a distance of 0.5 meters. In another example, the intensity or brightness of the candidate reflection 144 may be used to approximate the distance "D". For example, if the average intensity of the region of the candidate reflection 144 is 255 the distance may be deemed to be within a first range, such as less than 1 meter, while an average intensity of 128 may be deemed within a second range of 2-3 meters. The distance determination module 234 may use one or more of the implementations described above in combination. For example, the stereovision techniques and data from the TOF sensors 216 may be compared. If a variance between the two distances exceeds a threshold value, the AMD 104 may be directed to explore the associated portion of the physical space 102.

Once a candidate reflection 144 has been determined, the reflection module 112 may attempt to determine information about the reflective surface 108, such as position and orientation in the physical space 102. The candidate reflection module 232 may be configured to coordinate operation of the camera 116 and the display device 122. For example, the candidate reflection module 232 may operate the display device 122 to present displayed image data 266 as the displayed image 162 during acquisition of the third image 170.

In other implementations the reflection module 112 may use displayed image data 266, such as an image buffer of a graphics subsystem used to drive the display device 122, to determine when a displayed image 162 was presented, duration of the presentation, whether the presentation corresponds in time with the acquired image data 274, and so forth. The displayed image data 266 may comprise information that indicates when a particular image was presented on the display device 122, characteristics of that presentation such as brightness, time, and so forth. The display device 122 may be operated by other processes on the AMD 104, responsive to user commands, responsive to commands from the reflection module 112, and so forth.

A feature detection module 236 is used to determine the presence of one or more of the features 176 in image data 274. The image data 274 may comprise images acquired by one or more of the cameras 116. The feature detection module 236 processes at least a portion of the image data 274 to determine feature data 282. For example, the feature detection module 236 may process the portion of the third image 170 designated by the area of interest 172.

Various techniques may be used to determine the presence of features 176 in image data 274. For example, one or more of a Canny detector, Sobel detector, difference of Gaussians, features from accelerated segment test (FAST) detector, scale-invariant feature transform (SIFT), speeded up robust features (SURF), artificial neural network, or other detection methodologies may be used to determine the features 176 in the image data 274. A feature 176 that has been detected may have an associated descriptor that characterizes that feature 176. The descriptor may comprise a vector value in some implementations. For example, the descriptor may comprise data indicative of the feature 176 with respect to a plurality of different dimensions. In some implementations the descriptor may comprise data that is encoded by the feature 176, or that the feature 176 is designated as representing. For example, the feature 176 may encode a value that is indicative of "corner1".

An individual feature 176 is also associated with an image location 146. For example, the feature data 282 may indicate that feature 176(1) that is associated with "corner1" is located at an image location 146 of (384,993) in the third image 170.

In some implementations the candidate reflection module 232 and the feature detection module 236 may be combined. For example, the feature detection module 236 may be used to determine the candidate reflection 144.

The pose recovery module 238 uses information such as the displayed image data 266, information about the geometry of the AMD 104, the feature data 282, and so forth to determine the reflective surface data 114. For example, the pose recovery module 238 may use the feature data 282 that indicates the image locations 146 of the four corners of displayed image 162 as reflected 174 by the reflective surface 108 and depicted in the third image 170. Given the known geometry of the display device 122, characteristics of the camera 116, placement of the features 164 in the displayed image 162, and the image locations 146 of the features 176 in the reflection, the distance and orientation of the reflective surface 108 may be calculated. The pose recovery module 238 may implement a perspective-n-point algorithm. For example, the pose recovery module 238 may use the solvePNP library in OpenCV to determine the apparent pose of the reflection of the display device 174 in the reflective surface 108. In other implementations, other techniques may be used.

The actual pose of the reflective surface 108 that is assumed to be planar may be obtained by determining midpoints between the points on the displayed image 162 and the corresponding points of the reflection of the display device 174. These midpoints may be assumed to lie on the planar reflective surface 108. For example, each corner of the displayed image 162 corresponds to a corner of the reflection of the display device 174.

Operation of the reflection module 112 may be modified based on information about the ambient environment of the physical space 102, time of day, and so forth. In one implementation, the reflection module 112 may use data from an ambient light sensor (see FIG. 3) during operation. For example, operation of the reflection module 112 may be limited to situations, such as night time, when the ambient light sensor indicates the ambient light level is less than a threshold value. In another example, some operations of the reflection module 112 may be deferred until a later time. For example, while moving about the physical space 102 the AMD 104 may use the candidate reflection module 232 to determine candidate reflections 144. At another time, the AMD 104 may return to the physical space 102 associated with the candidate reflection 144 and attempt to complete determination of the reflective surface data 114. For example, the AMD 104 may return at a later time, present the displayed image 162, acquire the third image 170, and so forth.

The reflection module 112 may operate in conjunction with other modules. In one implementation the autonomous navigation module 252 may move the AMD 104 to various positions in the physical space 102 to determine the reflective surface data 114. For example, once a position of a reflective surface 108 has been determined in the physical space 102, the AMD 104 may be directed to move in parallel with that reflective surface 108 to determine the boundaries of that reflective surface 108. Continuing the example, by moving in parallel with the window, the reflection module 112 is able to determine where the edges of the window are, as indicated by the disappearance of the reflection of the display device 174 in subsequent images.

The reflection module 112 may operate while the AMD 104 performs mapping operations, carrying out other tasks, and so forth. For example, the light 120 may comprise an infrared light that is not visible to human users. While moving about, the AMD 104 may activate the light 120 and the candidate reflection module 232 may process at least a portion of the image data 274 acquired by the cameras 116 to detect a candidate reflection 144, if any.

The safety module 228 may access the safety tolerance data 260 to determine within what tolerances the AMD 104 may operate safely within the physical space 102. For example, the safety module 228 may be configured to reduce the speed at which the AMD 104 moves as it approaches a reflective surface 108. In another example, the safety module 228 may access safety tolerance data 260 that specifies a minimum distance from an object that the AMD 104 is to maintain. Continuing this example, when a sensor 216 detects an object has approached to less than the minimum distance, all movement of the AMD 104 may be stopped. Movement of the AMD 104 may be stopped by one or more of inhibiting operations of one or more of the motors, issuing a command to stop motor operation, disconnecting power from one or more the motors, and so forth. The safety module 228 may be implemented as hardware, software, or a combination thereof.

The navigation map module 250 uses the occupancy map 290 as input to generate the navigation map 292. The navigation map module 250 may produce the navigation map 292 to inflate or enlarge the obstacles 106 indicated by the occupancy map 290. One or more inflation parameters may be used during operation. The inflation parameters provide information such as inflation distance, inflation adjustment values, and so forth. In some implementations the inflation parameters may be based at least in part on the sensor FOV 118, sensor blind spot, physical dimensions of the AMD 104, and so forth.

The autonomous navigation module 252 provides the AMD 104 with the ability to navigate within the physical space 102 without real-time human interaction. The autonomous navigation module 252 may implement, or operate in conjunction with, the mapping module 230 to determine the occupancy map 290, the navigation map 292, or other representation of the physical space 102. In one implementation, the mapping module 230 may use one or more simultaneous localization and mapping ("SLAM") techniques. The SLAM algorithms may utilize one or more of maps, algorithms, beacons, or other techniques to navigate. The autonomous navigation module 252 may use the navigation map 292 to determine a set of possible paths along which the AMD 104 may move. One of these may be selected and used to determine path plan data 296 indicative of a path. For example, a possible path that is the shortest or has the fewest turns may be selected and used to determine the path. The path is then subsequently used to determine a set of commands that drive the motors connected to the wheels. For example, the autonomous navigation module 252 may determine the current location within the physical space 102 and determine path plan data 296 that describes the path to a destination location such as the docking station.

The autonomous navigation module 252 may utilize various techniques during processing of sensor data 110. For example, image data 274 obtained from cameras 116 on the AMD 104 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The AMD 104 may move responsive to a determination made by an onboard processor 206, in response to a command received from one or more communication interfaces 208, as determined from the sensor data 110, and so forth. For example, an external server may send a command that is received using the network interface 212. This command may direct the AMD 104 to proceed to find a particular user, follow a particular user, and so forth. The AMD 104 may then process this command and use the autonomous navigation module 252 to determine the directions and distances associated with carrying out the command. For example, the command to "come here" may result in a task module 254 sending a command to the autonomous navigation module 252 to move the AMD 104 to a particular location near the user and orient the AMD 104 in a particular direction.

The AMD 104 may connect to a network using one or more of the network interfaces 212. In some implementations, one or more of the modules or other functions described here may execute on the processors 206 of the AMD 104, on the server, or a combination thereof. For example, one or more servers may provide various functions, such as automated speech recognition (ASR), natural language understanding (NLU), providing content such as audio or video to the AMD 104, and so forth.

The other modules 256 may provide other functionality, such as object recognition, speech synthesis, user identification, and so forth. The other modules 256 may comprise a speech synthesis module that is able to convert text data to human speech. For example, the speech synthesis module may be used by the AMD 104 to provide speech that a user is able to understand.

The data store 224 may store the other data 298 as well. For example, localization settings may indicate local preferences such as language, user identifier data may be stored that allows for identification of a particular user, and so forth.

Figure 3:
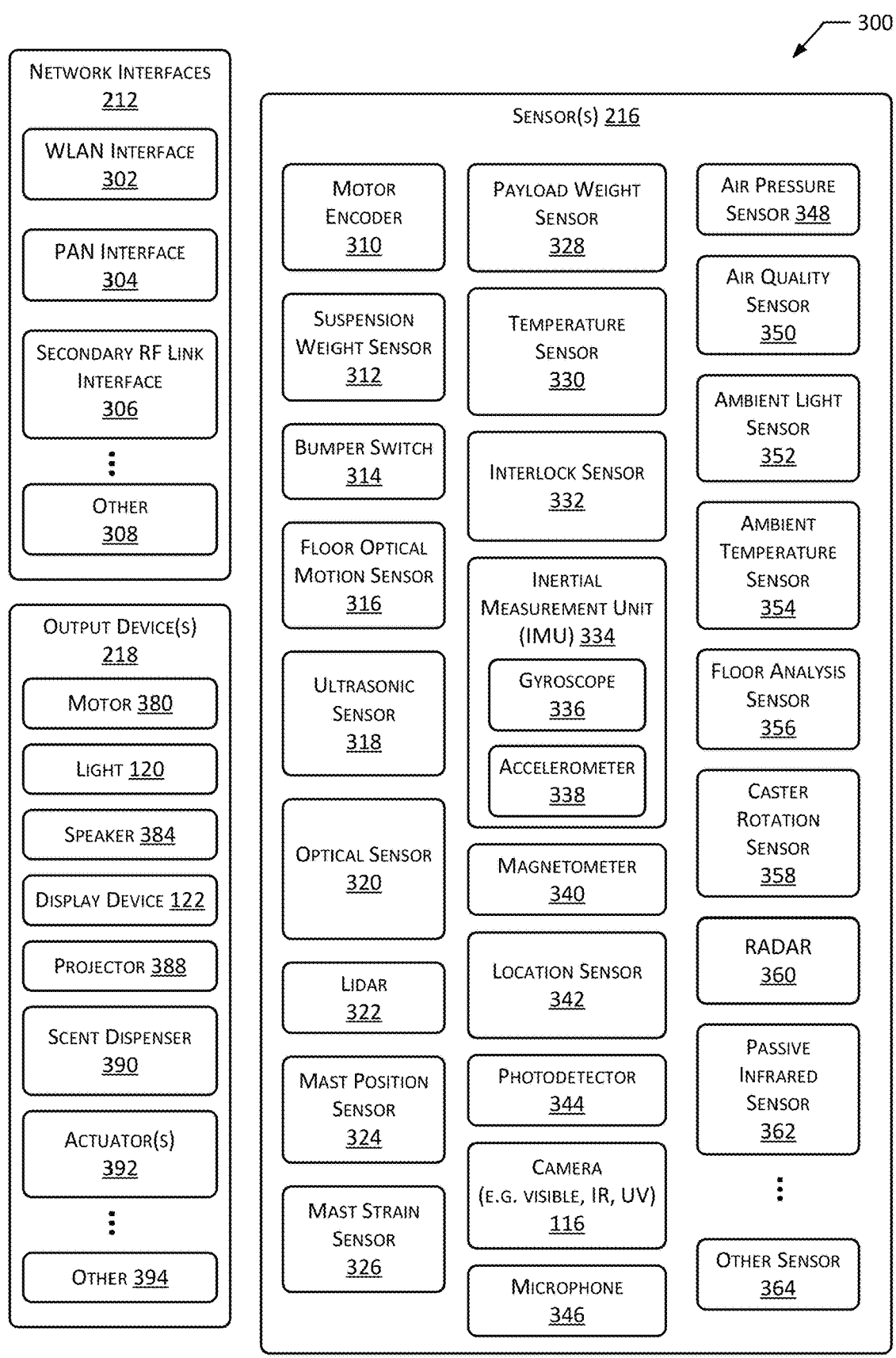
FIG. 3 is a block diagram of some components of the AMD, such as sensors and output devices, according to some implementations.

FIG. 3 is a block diagram 300 of some components of the AMD 104 such as network interfaces 212, sensors 216, and output devices 218, according to some implementations. The components illustrated here are provided by way of illustration and not necessarily as a limitation. For example, the AMD 104 may utilize a subset of the particular network interfaces 212, output devices 218, or sensors 216 depicted here, or may utilize components not pictured. One or more of the sensors 216, output devices 218, or a combination thereof may be included on a moveable component that may be panned, tilted, rotated, or any combination thereof with respect to a chassis of the AMD 104.

The network interfaces 212 may include one or more of a WLAN interface 302, PAN interface 304, secondary radio frequency (RF) link interface 306, or other 308 interface. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices in the event that communication fails using one or more of the WLAN interface 302 or the PAN interface 304. For example, in the event the AMD 104 travels to an area within the physical space 102 that does not have Wi-Fi coverage, the AMD 104 may use the secondary RF link interface 306 to communicate with another device such as a specialized access point, docking station, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 3G, 4G, 5G, LTE, or other standards.

The AMD 104 may include one or more of the following sensors 216. The sensors 216 depicted here are provided by way of illustration and not necessarily as a limitation. It is understood that other sensors 216 may be included or utilized by the AMD 104, while some sensors 216 may be omitted in some configurations.

A motor encoder 310 provides information indicative of the rotation or linear extension of a motor 380. The motor 380 may comprise a rotary motor, or a linear actuator. In some implementations, the motor encoder 310 may comprise a separate assembly such as a photodiode and encoder wheel that is affixed to the motor 380. In other implementations, the motor encoder 310 may comprise circuitry configured to drive the motor 380. For example, the autonomous navigation module 252 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster.

One or more bumper switches 314 provide an indication of physical contact between a bumper or other member that is in mechanical contact with the bumper switch 314. The safety module 228 utilizes sensor data 110 obtained by the bumper switches 314 to modify the operation of the AMD 104. For example, if the bumper switch 314 associated with a front of the AMD 104 is triggered, the safety module 228 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as a light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 216 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view 118. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 110 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) 118 that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 216 such as an image sensor or camera 116. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 228 and the autonomous navigation module 252 may utilize the sensor data 110 indicative of the distance to an object in order to prevent a collision with that object.

Multiple optical sensors 320 may be operated such that their FOV 118 overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 110 may be generated that is indicative of the presence of objects and the relative positions, shapes, and so forth that are visible to the lidar 322. Data from the lidar 322 may be used by various modules. For example, the autonomous navigation module 252 may utilize point cloud data generated by the lidar 322 for localization of the AMD 104 within the physical space 102.

The AMD 104 may include a mast. For example, a light 120 may be mounted on the mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector to determine the distance to which the mast is extended. In another implementation, the mast position sensor 324 may comprise an encoder wheel that is attached to a mast motor that is used to raise or lower the mast. The mast position sensor 324 may provide data to the safety module 228. For example, if the AMD 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the AMD 104. For example, the mast strain sensor 326 may comprise a strain gauge or load cell that measures a side-load applied to the mast or a weight on the mast or downward pressure on the mast. The safety module 228 may utilize sensor data 110 obtained by the mast strain sensor 326. For example, if the strain applied to the mast exceeds a threshold amount, the safety module 228 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 228 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 202, one or more motors 380, and so forth. In the event the temperature exceeds a threshold value, the component associated with that device temperature sensor 330 may be shut down.

One or more interlock sensors 332 may provide data to the safety module 228 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

An inertial measurement unit (IMU) 334 may include a plurality of gyroscopes 336 and accelerometers 338 arranged along different axes. The gyroscope 336 may provide information indicative of rotation of an object affixed thereto. For example, a gyroscope 336 may generate sensor data 110 that is indicative of a change in orientation of the AMD 104 or a portion thereof.

The accelerometer 338 provides information indicative of a direction and magnitude of an imposed acceleration. Data such as rate of change, determination of changes in direction, speed, and so forth may be determined using the accelerometer 338. The accelerometer 338 may comprise mechanical, optical, micro-electromechanical, or other devices. For example, the gyroscope 336 in the accelerometer 338 may comprise a prepackaged solid-state unit.

A magnetometer 340 may be used to determine an orientation by measuring ambient magnetic fields, such as the terrestrial magnetic field. For example, the magnetometer 340 may comprise a Hall effect transistor that provides output compass data indicative of a magnetic heading.

The AMD 104 may include one or more location sensors 342. The location sensors 342 may comprise an optical, radio, or other navigational system such as a global positioning system (GPS) receiver. For indoor operation, the location sensors 342 may comprise indoor position systems, such as using Wi-Fi Positioning Systems (WPS). The location sensors 342 may provide information indicative of a relative location, such as "living room" or an absolute location such as particular coordinates indicative of latitude and longitude, or displacement with respect to a predefined origin.

A photodetector 344 provides sensor data 110 indicative of impinging light. For example, the photodetector 344 may provide data indicative of a color, intensity, duration, and so forth.

A camera 116 generates sensor data 110 indicative of one or more images. The camera 116 may be configured to detect light in one or more wavelengths including, but not limited to, terahertz, infrared, visible, ultraviolet, and so forth. For example, an infrared camera 116 may be sensitive to wavelengths between approximately 700 nanometers and 1 millimeter. The camera 116 may comprise charge coupled devices (CCD), complementary metal oxide semiconductor (CMOS) devices, microbolometers, and so forth. The AMD 104 may use image data 274 acquired by the camera 116 for object recognition, navigation, collision avoidance, user communication, and so forth. For example, a pair of cameras 116 sensitive to infrared light may be mounted on the front of the AMD 104 to provide binocular stereo vision, with the sensor data 110 comprising images being sent to the reflection module 112, the autonomous navigation module 252, and so forth. In another example, the camera 116 may comprise a 10 megapixel or greater camera that is used for videoconferencing or for acquiring pictures for the user.

One or more microphones 346 may be configured to acquire information indicative of sound present in the physical space 102. In some implementations, arrays of microphones 346 may be used. These arrays may implement beamforming techniques to provide for directionality of gain. The AMD 104 may use the one or more microphones 346 to acquire information from acoustic tags, accept voice input from users, determine a direction of an utterance, determine ambient noise levels, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth.

In another example, the air quality sensor 350 may include a hygrometer that provides information indicative of relative humidity.

An ambient light sensor 352 may comprise one or more photodetectors or other light-sensitive elements that are used to determine one or more of the color, intensity, or duration of ambient lighting around the AMD 104.

An ambient temperature sensor 354 provides information indicative of the temperature of the ambient physical space 102 proximate to the AMD 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 228, the autonomous navigation module 252, the task module 254, and so forth. For example, if the floor analysis sensor 356 determines that the floor is wet, the safety module 228 may decrease the speed of the AMD 104 and generate a notification alerting the user.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 216 may include a radar 360. The radar 360 may be used to provide information as to a distance, lateral position, and so forth, to an object. For example, the radar 360 may determine the distance "D" to the reflective surface 108.

The sensors 216 may include a passive infrared (PIR) sensor 362. The PIR 362 sensor may be used to detect the presence of users, pets, hotspots, and so forth. For example, the PIR sensor 362 may be configured to detect infrared radiation with wavelengths between 8 and 14 micrometers.

The AMD 104 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical space 102 to provide landmarks for the autonomous navigation module 252. One or more touch sensors may be utilized to determine contact with a user or other objects.

The AMD 104 may include one or more output devices 218. A motor 380 may be used to provide linear or rotary motion. For example, one or more motors 380 may be used to move the AMD 104 from one location to another. In another example, one or more motors 380 may move the display device 122 with respect to a chassis of the AMD 104.

A light 120 may be used to emit photons. For example, the light 120 may comprise a light emitting diode (LED), electroluminescent device, a quantum dot, laser, incandescent bulb, fluorescent tube, and so forth.

A speaker 384 may be used to emit sound.

The display device 122 may comprise one or more of a liquid crystal display, light emitting diode display, electrophoretic display, cholesteric liquid crystal display, interferometric display, and so forth. The display 122 may include a backlight or a frontlight. The display device 122 may be used to present visible information such as graphics, pictures, text, and so forth. For example, the display device 122 may comprise an array of light emitting components, such as LEDs. In some implementations, the display device 122 may comprise a touchscreen that combines a touch sensor and a display device 122.

In some implementations, the AMD 104 may be equipped with a projector 388. The projector 388 may be able to project an image on a surface, such as the floor, wall, ceiling, and so forth. In some implementations the projector 388 may be used to present the displayed image 162.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user. Continuing the example, a motor 380 with an eccentric weight may be used to create a buzz or vibration to allow the AMD 104 to simulate the purr of a cat.

Figure 4:
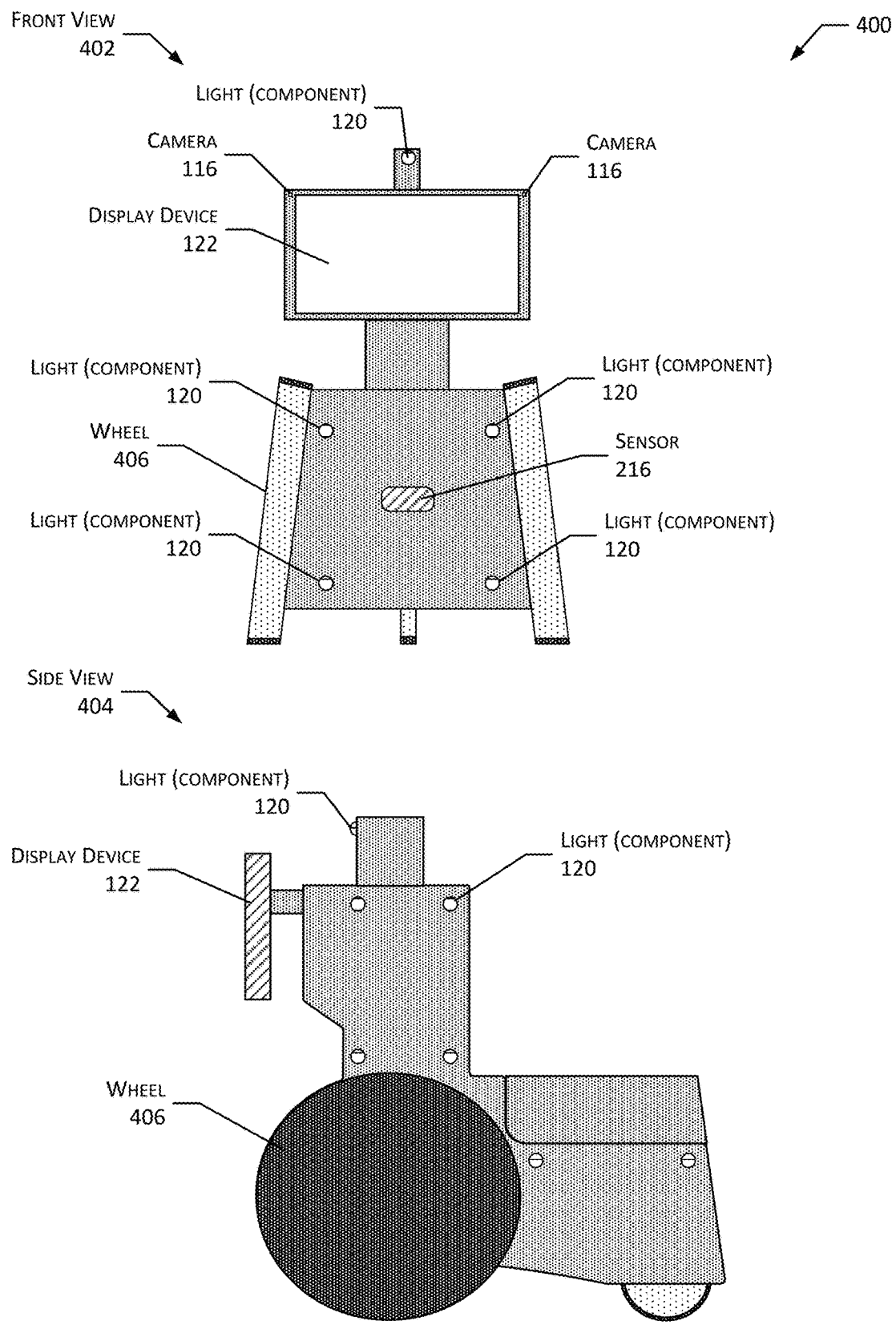
FIG. 4 depicts views of a front and side of the AMD, according to some implementations.

FIG. 4 depicts views 400 of a front view 402 and side view 404 of the AMD 104, according to some implementations. As shown in these views, lights 120 may be provided at different locations on the AMD 104. These lights 120 may be activated and deactivated as described above to emit light 124. Specific configurations of lights 120 may be operated to provide a particular pattern of emitted light 124. This pattern may be provided by simultaneously activating particular lights 120, operating particular lights 120 in a particular time sequence, and so forth. For example, four lights 120 on a front of the AMD 104 may be activated simultaneously to provide four points of emitted light 124. In another example, the pattern may be provided by modulating the emitted light 124. Continuing the example, the color of the emitted light 124 may be changed, a particular pulse code modulation frequency may be used, and so forth. This emitted light 124 may be reflected by the reflective surface 108 and determined in one or more images acquired by the camera 116.

As described above, the AMD 104 may include one or more sensors 216. As illustrated here, a sensor 216 such as a time of flight sensor such as an ultrasonic sensor 318, radar 360, and so forth may be used to determine the distance "D" to the reflective surface 108.

In this illustration, a pair of cameras 116 are arranged proximate to the display device 122. For example, these cameras 116 may be used to provide stereovision and acquire images for use by the reflection module 112.

Also shown are wheels 406 that may be connected to motors 380 that may be used to move the AMD 104 from one location to another in the physical space 102. For example, the autonomous navigation module 252 may generate instructions that drive the motors 380 to move the AMD 104 to a particular location in the physical space 102.

Figure 5:
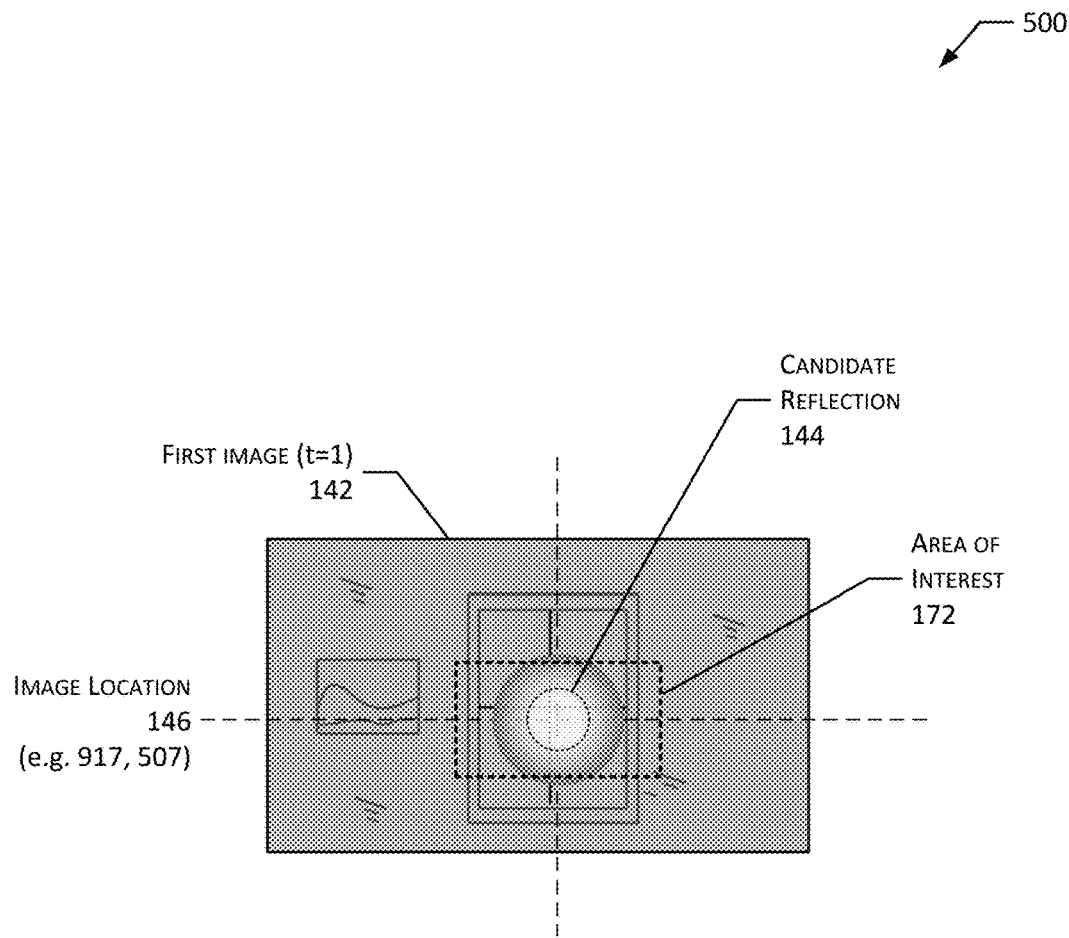
FIG. 5 depicts a first image acquired at a first time that includes a candidate reflection, according to some implementations.

FIG. 5 depicts at 500 the first image 142 acquired at a first time that includes a candidate reflection 144, according to some implementations. The candidate reflection 144 may comprise a region that has an area within a threshold range, is circular, and have at least a threshold color or intensity value. For example, the SimpleBlobDetector function of the OpenCV library may be used to determine a candidate reflection 144. In other implementations, other techniques may be used. By restricting the candidate reflections 144 to having an area within a threshold range that is greater than a minimum size and less than a maximum size, incorrect determinations of candidate reflections 144 may be reduced. Likewise, by assessing the shape of the region incorrect determinations may be reduced. For example, if the light 120 comprises an LED with a lens, it may be expected to emit substantially as a point source with a circular pattern, and a reflection would similarly exhibit a circular pattern. Other values such as color or intensity may be further used to avoid incorrect determinations of the candidate reflection 144. For example, if the light 120 has been determined to emit light at 550 nm, then the resulting first image 142 may be filtered by a corresponding color value.

In this illustration, the candidate reflection 144 is depicted with a gradient, being brightest at the center and darkening as radial distance increases. The candidate reflection 144 may correspond to a region indicated in this illustration by a circle with a broken light, corresponding to a boundary where the intensity or brightness transitions below a threshold value. The image location 146 associated with the candidate reflection 144 may be associated with a particular portion of the candidate reflection 144. For example, as shown here the image location 146 at the center of the region designated as the candidate reflection 144 may be used. In other examples, other portions of the region may be used.

Also depicted is the area of interest 172. The area of interest 172 may be specified based at least in part on the image location 146 of the candidate reflection 144. For example, the area of interest 172 may be centered on the image location 146 of the candidate reflection 144. In some implementations, the size of the area of interest 172 may vary. For example, the size of the area of interest 172 may be determined based on the distance D between the AMD 104 and the reflective surface 108. In other implementations, the size of the area of interest 172 may be fixed. For example, the size of the area of interest 172 may be based on a maximum effective range of a TOF sensor 216.

As described the reflection module 112 may process the portion of the third image 170 within the area of interest 172 to determine one or more features 176. For example, the area of interest 172 of the third image 170 may be processed by the feature detection module 236 to determine feature data 282 indicative of features 176 in the third image 170, as shown in FIG. 6.

Figure 6:
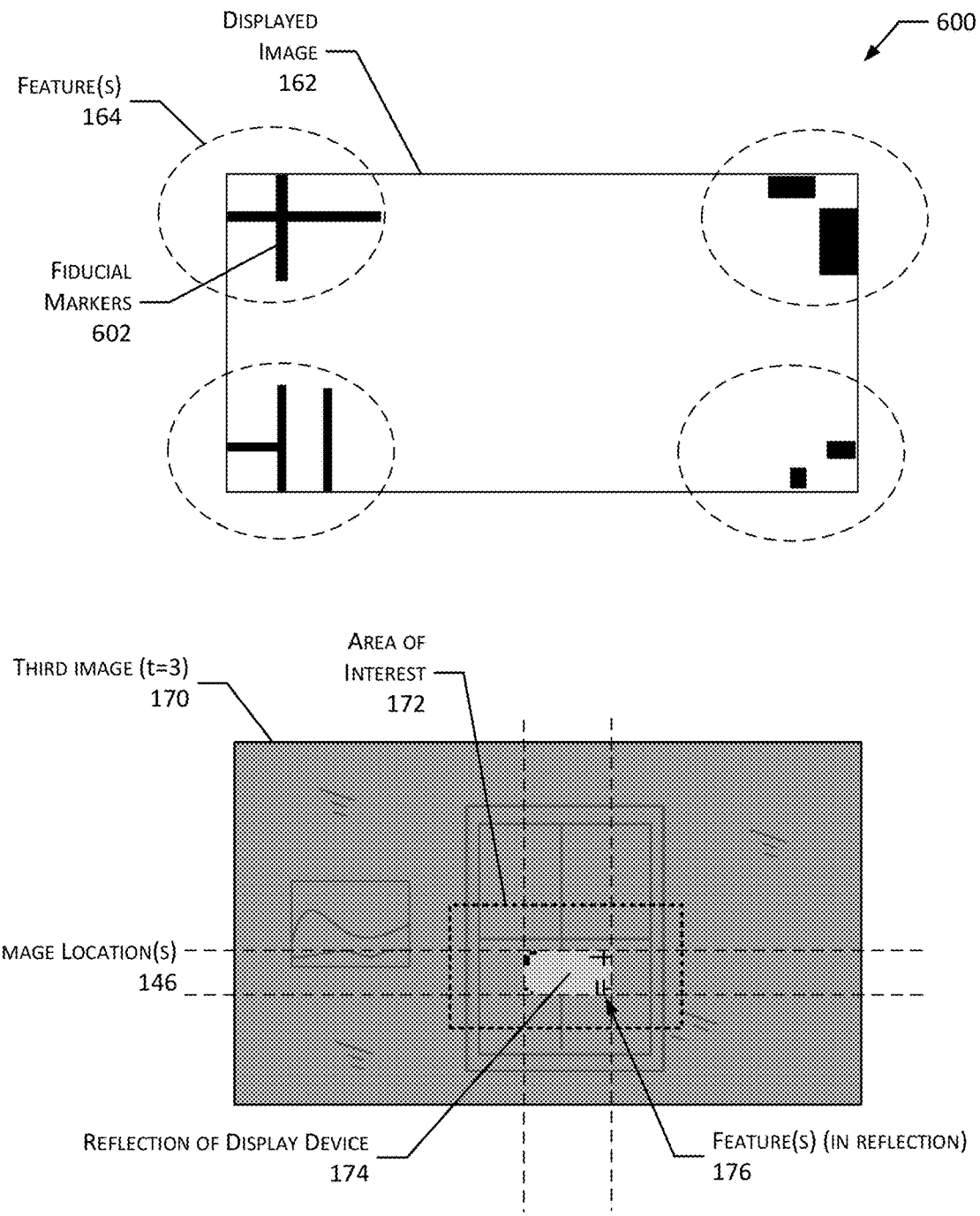
FIG. 6 depicts a displayed image and a third image acquired at a third time that includes reflection of the displayed image, according to some implementations.

FIG. 6 depicts at 600 a displayed image 162 and a third image 170 acquired at a third time that includes reflection of the displayed image 162, according to some implementations. The reflection module 112 may operate the display device 122 to present the displayed image 162.

The displayed image 162 may include a plurality of features 164 that are visible. For example, the displayed image 162 may comprise a plurality of fiducial markers 602. These fiducial markers 602 may be configured to provide unique indicia of particular locations within the displayed image 162, orientation of the displayed image 162, and so forth. For example, the fiducial markers 602 may comprise particular patterns of light and dark squares that encode information about the presence of a particular corner of a rectangular pattern and indicate a specific corner in the rectangular pattern. Continuing the example, the displayed image 162 may comprise a two-dimensional barcode with fiducial elements.

In some implementations, such as depicted here, each corner of the displayed image 162 is associated with a distinct fiducial marker 602, allowing each particular corner of the displayed image 162 to be distinguished.

In another implementation, not shown, the displayed image 162 may comprise a set of pixels that have at least a specified color value and the features 164 comprise the edges of the displayed image 162. For example, the display device 122 may present a white rectangle. In this example, the features 164 comprise the transition between the displayed white rectangle and a non-illuminated bezel. The specified color value may be determined to provide a distinguishable contrast with respect to objects in the physical space 102, such as the color of the bezel or frame around the display device 122, color of the exterior of the AMD 104, furnishings or walls in the physical space 102, and so forth. For example, if the walls and furnishings are white, the specified color value may be green.

In another implementation, not shown, the displayed image 162 may comprise one or more lines or border proximate to the edges of the displayed image 162. For example, a white border that is 200 pixels thick may surround a black central region of the displayed image 162.

In another implementation, not shown, the displayed image 162 may comprise an image of a scene, person, and so forth. The displayed image 162 may include one or more features 164. For example, the features 164 may be determined by a feature detector, such as a trained neural network.

The displayed image 162 may be presented in a way which is imperceptible or minimally perceptible to a person. For example, the display device 122 may present a first frame of video that comprises the displayed image 162 followed by a second frame of video that comprises an inverse version of the displayed image 162. In another example, the display device 122 may present the displayed image 162 for a relatively short period of time, such as less than $1/30^{th}$ of a second.

Also shown in this figure is the third image 170 and the area of interest 172. Within the area of interest 172 a reflection of the display device 174 has been detected. The features in the reflection 176 are visible having been flipped left-to-right due to reflection. The four corners of the reflection of the display device 174 are designated by corresponding image locations 146 in the third image 170.

Figure 7:
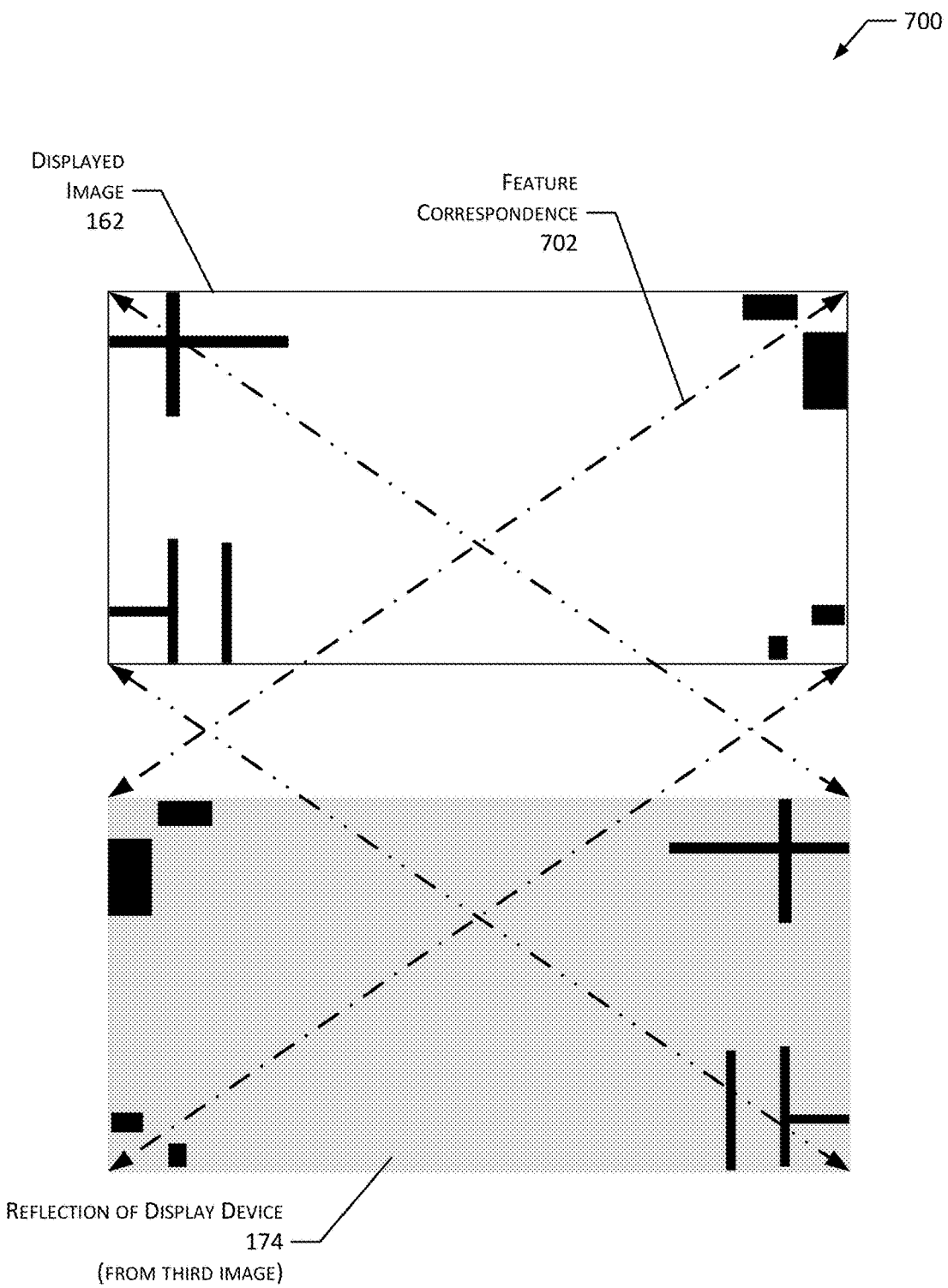
FIG. 7 depicts the correspondence between features in the displayed image and the reflection of the display device depicted in the third image, according to some implementations.

FIG. 7 depicts at 700 the correspondence between features 164 in the displayed image 162 and the features 176 in the reflection of the display device 174 depicted in the third image 170, according to some implementations. In this illustration the correspondence is illustrated by broken lines that relate each corner of the displayed image 162 to a corresponding corner of the reflection of the display device 174 depicted in the third image 170.

While the correspondence is shown for corners, it is understood that other features elsewhere in the displayed image 162 may be used. Likewise, as described above, particular patterns of lights 120 may be used instead of the displayed image 162.

In implementations where the features 176 do not encode information, information may be assumed. For example, if the displayed image 162 is a white rectangle with no features, information such as identity of a particular corner may be assumed. Continuing the example, the top left corner of the displayed image 162 may be deemed to correspond to the uppermost and rightmost corner of the reflection of the display device 174 in the third image 170. Likewise, the lower right corner of the displayed image 162 may be deemed to correspond to the lowermost left corner of the reflection of the display device 174 in the third image 170.

Figure 8:
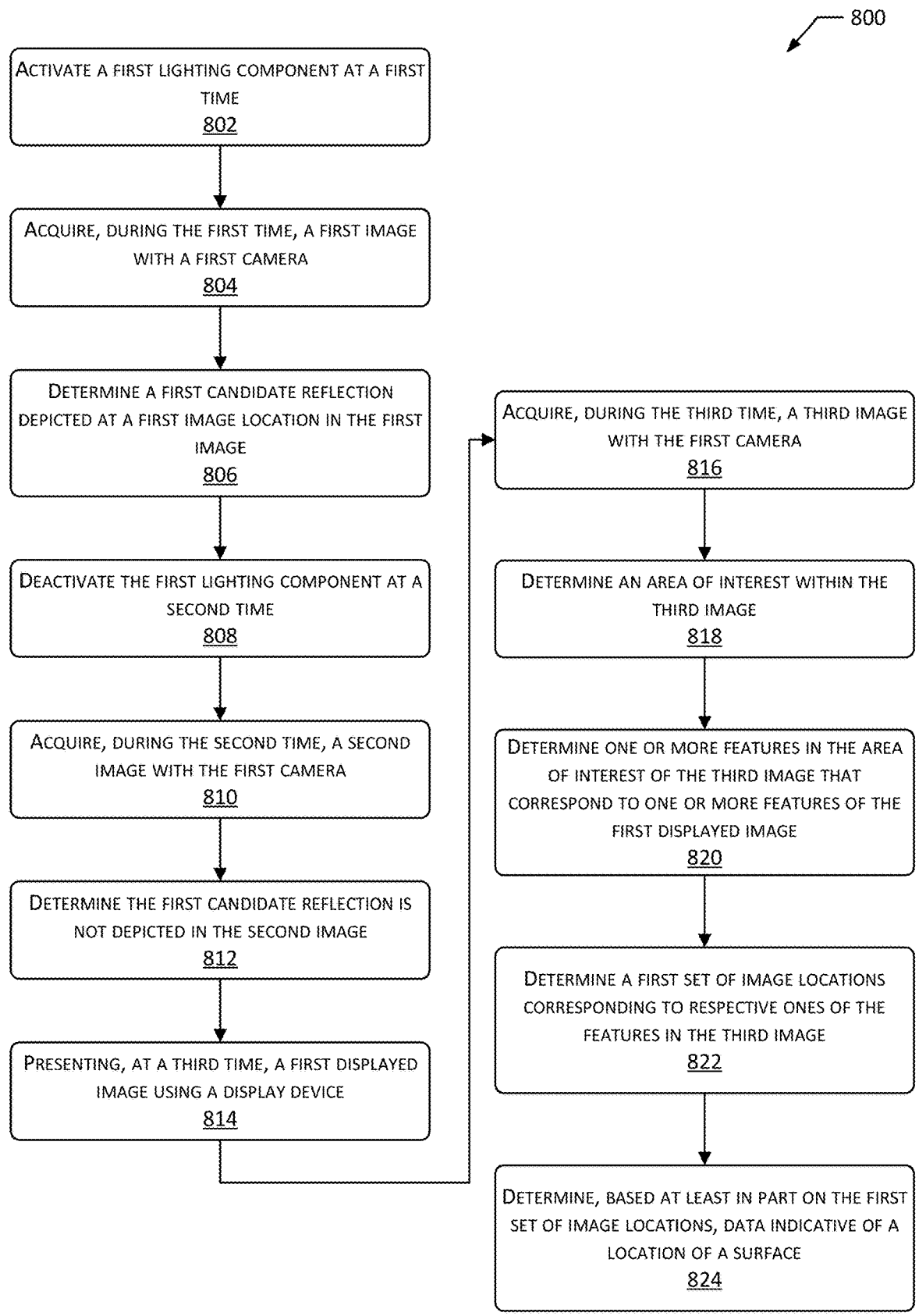
FIG. 8 is a flow diagram of a process for determining reflective surfaces in a physical space, according to some implementations.

FIG. 8 is a flow diagram 800 of a process for determining reflective surfaces 108 in a physical space, according to some implementations. The process may be implemented at least in part by one or more of the AMD 104, the docking station, a server, or other device.

At 802 a first lighting component is activated at or during a first time interval. For example, the light 120 on a mast of the AMD 104 may be activated to emit or output light 124 that is infrared into the physical space 102.

At 804, during the first time interval, a first image 142 is acquired with the first camera 116. In implementations where stereovision is available using two cameras 116, stereopairs of images comprising an image acquired by a left camera 116 and an image acquired by a right camera 116 may be used.

At 806, a first candidate reflection 144 is determined as being depicted at a first image location 146 (first location) in the first image 142. For example, the candidate reflection module 232 may determine candidate reflection data 280 indicative of the candidate reflection 144.

At 808, the first lighting component is deactivated at a second time interval. The output of the light by the first lighting component may cease at the second time. For example, the light 120 is turned off.

At 810, during the second time interval, a second image 152 is acquired with the first camera 116.

At 812 the first candidate reflection 144 is determined to not be depicted in the second image 152. In one implementation this may involve determining that the first candidate reflection 144 is not depicted at a second location in the second image 152 that corresponds to the first location. For example, the candidate reflection module 232 may process the second image 152 and determine that no candidate reflection 144 is present, or that no candidate reflection 144 is present within a threshold distance of the image location 146 associated with the candidate reflection 144 in the first image 142. Because the candidate reflection 144 was detected when the first lighting component was activated and was not detected when the first lighting component was deactivated, a determination can be made that the first candidate reflection 144 is an actual reflection.

At 814, a plurality of features 164 are presented. In one implementation, a first displayed image 162 is presented using the display device 122 at a third time interval. The first displayed image 162 may comprise one or more features 164. In another implementation the plurality of features may be presented using other mechanisms. For example, the plurality of features may comprise a plurality of lighting components, paint, decals, materials with different colors, and so forth that are visible on the AMD 104.

At 816, during the third time interval, a third image 170 is acquired with the camera 116.

At 818, an area of interest 172 is determined within the third image 170. For example, the area of interest 172 may be determined based on the distance data 276 produced by the distance determination module 234 and the candidate reflection data 280.

At 820, one or more features 176 in the area of interest 172 are determined. For example, the feature detection module 236 may process at least the area of interest 172 in the third image 170 to detect the features 176 depicted in the reflection. Feature data 282 may be generated that indicates the image locations 146 (locations) of particular features, such as specific corners of the reflection of the display device 174 depicted in the third image 170.

At 822, a first set of image locations 146 (first set of locations) are determined that correspond to respective ones of the features 176 in the third image 170. For example, the first set of image locations 146 may specify the four corners of the reflection of the display device 174 in the third image 170.

At 824, based at least in part on the first set of image locations 146, data indicative of a location of a reflective surface 108 is determined. In one implementation, the pose recovery module 238 may use the first set of image locations 146 to determine the position and orientation of the reflective surface 108 in the physical space 102. For example, the pose recovery module 238 may generate reflective surface data 114 that indicates a plane of the reflective surface 108 and the position of that plane with respect to one or more landmarks in the physical space 102, such as a corner of a wall, edge of a doorway, and so forth.

Figure 9:
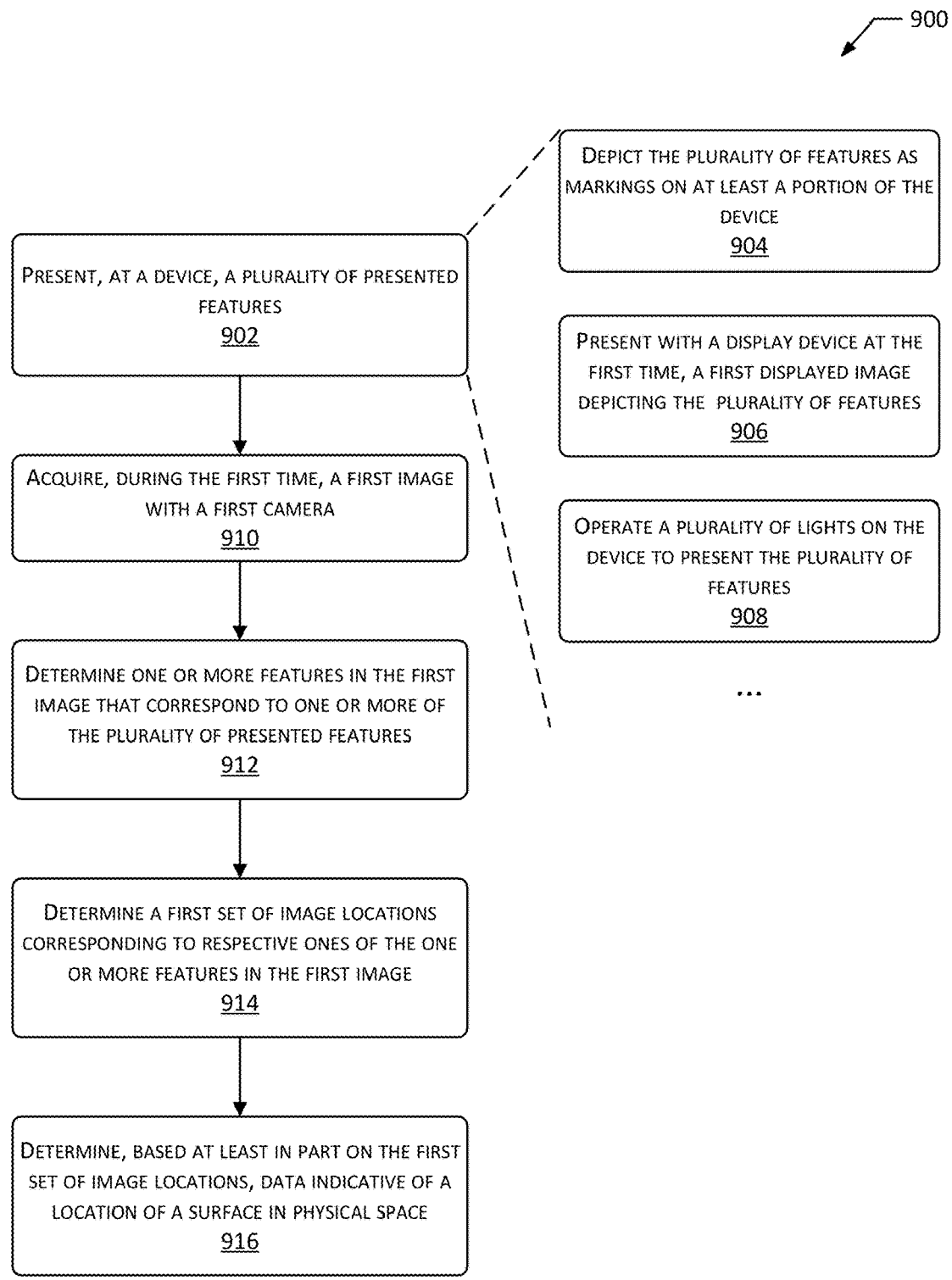
FIG. 9 is a flow diagram of another process for determining reflective surfaces in a physical space, according to some implementations.

FIG. 9 is a flow diagram 900 of another process for determining reflective surfaces 108 in the physical space 102, according to some implementations. The process may be implemented at least in part by one or more of the AMD 104, the docking station, a server, or other device.

At 902 the AMD 104 or other device presents a plurality of presented features at a first time. One or more of the following implementations may be used to present the plurality of presented features. In one implementation as indicated at 904, the presentation comprises depicting the features 164 on at least a portion of the AMD 104. For example, these markings may comprise paint, decals, materials with different colors, and so forth that are visible on the AMD 104.

In another implementation as indicated at 906, the presentation comprise using the display device 122 to present the displayed image 162.

In another implementation as indicated at 908, one or more lights 120 may be operated to emit light and present the plurality of features. For example, the light emitted by each light 120 may be a feature. A plurality of lights 120 may be used to present the plurality of presented features. In another example, each light 120 may illuminate a diffuser, light guide, lens, or other optical component to produce the presented feature.

At 910, a first image is acquired during the first time. For example, the camera 116 may acquire the first image.

At 912 one or more features that correspond to one or more of the plurality of presented features are determined in the first image. For example, the feature detection module 236 may process the first image to detect the features 176 depicted in the reflection. Feature data 282 may be generated that indicates the image locations 146 (locations) of particular presented features.

At 914, a first set of image locations 146 (first set of locations) are determined that correspond to respective ones of the features 176 in the first image. For example, the first set of image locations 146 may specify two or more of the features 176 in the first image.

At 916, based at least in part on the first set of image locations 146, reflective surface data 114 indicative of a reflective surface 108 in the physical space 102 is determined. In one implementation, a first set of locations in the physical space 102 that correspond to the one or more features 176 in the first image 142 may be determined. For example, if stereoimages are available, disparity of the image location for the feature 176 between a pair of images may be used to determine the location in the physical space 102. In other implementations other techniques may be used. The reflective surface 108 may be assumed to be planar, and so a plane that includes or is proximate to the first set of locations may be deemed to be a plane of the reflective surface 108.

In one implementation, the pose recovery module 238 may use the first set of image locations 146 to determine the position and orientation of the reflective surface 108 in the physical space 102. For example, the pose recovery module 238 may generate reflective surface data 114 that indicates a plane of the reflective surface 108 and the position of that plane with respect to one or more landmarks in the physical space 102, such as a corner of a wall, edge of a doorway, and so forth.

The plurality of image locations 146 may be compared to one or more hypotheses. Each hypothesis may correspond to a particular relative arrangement of the AMD 104 and a hypothetical reflective surface 108. A first set of hypotheses may be determined. These may be generated in advance, or on demand. Each hypothesis may be associated with a particular relative arrangement of a proposed reflective surface 108, the camera 116, and the presented plurality of features 164. Each hypothesis may also specify a relative arrangement of a plurality of image locations 146 that are each associated with respective ones of the plurality of presented features 164.

Once the plurality of image locations 146 of features 176 in an image have been determined, they may be compared with respect to the hypotheses. A highest ranking hypothesis having a confidence value greater than a threshold may be deemed to represent the reflective surface 108. For example, based on the first set of image locations 146, a first confidence value indicative of correspondence between the first set of image locations 146 and a first hypothesis from the first set of hypotheses may be determined. Likewise, based on the first set of image locations 146 a second confidence value indicative of correspondence between the first set of image locations 146 and a second hypothesis from the first set of hypotheses is also determined. Responsive to the first confidence value being greater than the second confidence value, the first hypothesis is designated as being representative of the reflective surface 108 in the physical space 102.

In other implementations, a neural network may be trained to accept as input the plurality of image locations 146 and generate as output at least a portion of the reflective surface data 114. For example, given a particular arrangement or configuration of image locations 146 in an image, the neural network may provide as output the reflective surface data 114 indicative of location and pose of the reflective surface 108.

The techniques described herein may be used by other devices and in other situations. For example, an augmented reality device, virtual reality device, mobile phone, tablet, and so forth may determine the presence and location of the reflective surface 108 using the techniques described in this disclosure.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
outputting light at a first time into a physical space;

acquiring, at the first time, a first image of the physical space with a first camera;
determining that a first candidate reflection is depicted at a first location in the first image;
ceasing outputting the light at a second time;
acquiring, at the second time, a second image of the physical space with the first camera;
determining that the first candidate reflection is not depicted in the second image at a second location, the second location corresponding to the first location in the first image;
determining that the first candidate reflection is an actual reflection;
acquiring, at a third time, a third image of the physical space with the first camera;
determining, in the third image, a first set of locations corresponding to respective ones of a known set of features; and
determining, based at least in part on the first set of locations, data indicative of presence of a reflective surface in the physical space.

2. The method of claim 1, further comprising:
determining a first distance indicative of a distance in the physical space from the first camera to the reflective surface;
determining, based on the first distance, a first area within the third image; and
determining that the first set of locations are within the first area.

3. The method of claim 1, wherein the determining that the first candidate reflection is depicted at the first location in the first image comprises:
determining that a region comprises one or more of:
an area that is greater than a first threshold value and less than a second threshold value,
a circularity value that is greater than a third threshold value, or
a color value that is greater than a fourth threshold value.

4. The method of claim 1, wherein a lighting component outputs light at a first intensity at the first time; and the method further comprising:
determining a first brightness value of one or more pixels associated with the first candidate reflection in the first image;
outputting light at a fourth time at a second intensity that is less than the first intensity;
acquiring, at the fourth time, a fourth image of the physical space with the first camera;
determining that the first candidate reflection is depicted in the fourth image;
determining a second brightness value of one or more pixels associated with the first candidate reflection in the fourth image; and
responsive to the second brightness value exceeding a threshold value, determining that the reflective surface comprises a mirror.

5. The method of claim 1, further comprising:
measuring a distance between a device attached to the first camera and the reflective surface using a time of flight (TOF) sensor, wherein the TOF sensor emits one or more of a sound or an electromagnetic signal; and
determining, based at least in part on the distance, data indicative of a location of the reflective surface in the physical space.

6. The method of claim 1, wherein the known set of features comprise a set of pixels on a display operating to present at least a specified color value and further wherein the known set of features comprise edges of the display.

7. The method of claim 1, wherein the known set of features comprise a plurality of fiducial markers in a specified orientation and arrangement with respect to a device; and the method further comprising:
detecting one or more of the plurality of fiducial markers in the third image; and
wherein individual ones of the first set of locations are associated with predetermined portions of respective fiducial markers.

8. The method of claim 1, further comprising:
determining the reflective surface is an obstacle that impairs traversal by an autonomous mobile device.

9. A device comprising:
a plurality of lighting components;
a first camera;
one or more memories storing first computer-executable instructions; and
one or more processors to execute the first computer-executable instructions to:
operate a first lighting component of the plurality of lighting components during a first time interval to output light;
acquire, during the first time interval and of a physical space, a first image with the first camera;
determine a first candidate reflection is depicted at a first location in the first image;
cease operation of the first lighting component during a second time interval;
acquire, during the second time interval and of the physical space, a second image with the first camera;
determine the first candidate reflection is not depicted in the second image;
determine that the first candidate reflection is an actual reflection;
acquire, during a third time interval, a set of one or more images of the physical space with the first camera;
determine a first set of locations in the set of one or more images, wherein each location in the first set of locations corresponds to a reflection of respective ones of a known set of features; and
determine, based at least in part on the first set of locations, data indicative of a location of a reflective surface in the physical space.

10. The device of claim 9, wherein the known set of features comprise one or more of:
light from an individual light emitting diode,
light from a set of light emitting diodes in a display device, or
light from a backlit liquid crystal display device.

11. The device of claim 9, wherein the one or more processors further execute the first computer-executable instructions to:
determine a first distance in the physical space from the device to the reflective surface;
determine, based on the first distance, a first area within an image acquired by the first camera; and
determine that the first set of locations are within the first area.

12. The device of claim 9, wherein the first computer-executable instructions to determine that the first candidate reflection is depicted at the first location in the first image further comprise instructions to:
determine that a region in the first image comprises one or more of:

an area that is greater than a first threshold value and less than a second threshold value,
a circularity value that is greater than a third threshold value, or
a color value that is greater than a fourth threshold value.

13. The device of claim 9, wherein the one or more processors further execute the first computer-executable instructions to:
operate the first lighting component at a first intensity during the first time interval;
determine a first brightness value of one or more pixels associated with the first candidate reflection in the first image;
operate one or more of the plurality of lighting components during a fourth time interval at a second intensity that is less than the first intensity;
acquire, during the fourth time interval and of the physical space, a third image with the first camera;
determine the first candidate reflection is depicted in the third image;
determine a second brightness value of one or more pixels associated with the first candidate reflection in the third image; and
responsive to the second brightness value exceeding a threshold value, determine that the reflective surface comprises a mirror.

14. The device of claim 9, further comprising:
a time of flight (TOF) sensor comprising an emitter and a detector; and
wherein the one or more processors further execute the first computer-executable instructions to:
measure a distance between the TOF sensor and the reflective surface in the physical space; and
determine, based at least in part on the distance, the data indicative of the location of the reflective surface in the physical space.

15. The device of claim 9, wherein the one or more processors further execute the first computer-executable instructions to:
determine the reflective surface is an obstacle that impairs traversal by the device.

16. The device of claim 9, wherein the plurality of lighting components output light during the third time interval to present a plurality of fiducial markers in a specified orientation and arrangement with respect to a display device; and
wherein the one or more processors further execute the first computer-executable instructions to:
detect one or more of the plurality of fiducial markers in the set of one or more images; and
wherein individual ones of the first set of locations are associated with predetermined portions of respective ones of the plurality of fiducial markers.

17. A device comprising:
a first camera;
one or more memories storing first computer-executable instructions; and
one or more processors to execute the first computer-executable instructions to:
present, at the device, a plurality of presented features at a first time;
acquire a first image at the first time using the first camera;
determine one or more features in the first image that correspond to one or more of the plurality of presented features;
determine a first set of locations corresponding to respective ones of the one or more features in the first image;
determine a first set of hypotheses, wherein each hypothesis in the first set:
is associated with a particular relative arrangement of a proposed reflective surface, the first camera, and the plurality of presented features, and
specifies a relative arrangement of a plurality of locations that are each associated with respective ones of the plurality of presented features;
determine, based on the first set of locations, one or more confidence values indicative of a correspondence between the first set of locations and a corresponding hypothesis from the first set of hypotheses; and
determine, based at least in part on the first set of locations, data indicative of a reflective surface in a physical space.

18. The device of claim 17, further comprising one or more of:
one or more markings on at least a portion of the device to present the plurality of presented features,
a display device to present a first displayed image depicting the plurality of presented features, or
a plurality of lights affixed to the device to present the plurality of presented features.

19. The device of claim 17, wherein the one or more processors further execute the first computer-executable instructions to:
determine a plane associated with the reflective surface based on the first set of locations in the physical space.

20. The device of claim 17, wherein the first computer-executable instructions to determine the data indicative of the reflective surface in the physical space further comprise instructions to:
determine, based on the first set of locations, a first confidence value indicative of correspondence between the first set of locations and a first hypothesis from the first set of hypotheses;
determine, based on the first set of locations, a second confidence value indicative of correspondence between the first set of locations and a second hypothesis from the first set of hypotheses; and
responsive to the first confidence value being greater than the second confidence value, designate the first hypothesis as representative of the reflective surface in the physical space.

* * * * *